United States Patent [19]

Pouey

[11] 4,241,999
[45] * Dec. 30, 1980

[54] MONOCHROMATORS

[75] Inventor: Michel Pouey, Viroflay, France

[73] Assignee: Agence Nationale de Valorisation de la Recherche (ANVAR), Neuilly sur Seine, France

[*] Notice: The portion of the term of this patent subsequent to Aug. 10, 1993, has been disclaimed.

[21] Appl. No.: 936,592

[22] Filed: Aug. 24, 1978

Related U.S. Application Data

[63] Continuation of Ser. No. 713,200, Aug. 10, 1976, abandoned.

[51] Int. Cl.³ .............................................. G01J 3/18
[52] U.S. Cl. .............................. 356/331; 350/162 R; 356/334
[58] Field of Search ............................. 356/331–332, 356/334; 350/162R

[56] References Cited

U.S. PATENT DOCUMENTS

| | | | |
|---|---|---|---|
| 3,973,850 | 8/1976 | Pouey | 356/100 |
| 4,036,558 | 7/1977 | Pouey | 356/79 |

OTHER PUBLICATIONS

Pouey, M. "Monochromateur a Double Entrée pour le Test des Composants Optiques dans l'Ultraviolet Lointain" Nouv. Rev. Optique 1974, pp. 323–331.
Pouey, M. "Design of Simple Rotating Stigmatic Concave Grating Monochromators", App. Optics, 12-1974, pp. 2739–2740.
Pouey, M. "Spectroscopie", C.R. Acad. Sc. Paris, Series B, vol. 272, 5-1971, pp. 1200–1202.
Pouey, M. "Second-Order Focusing Conditions for Ruled Concave Gratings", Jr. Optical Soc. America, vol. 64, 12-1974, pp. 1616–1622.

Primary Examiner—John K. Corbin
Assistant Examiner—Wm. H. Punter
Attorney, Agent, or Firm—Diller, Ramik & Wight

[57] ABSTRACT

Various vacuum ultraviolet monochromators embodying a rotatable diffraction grating and fixed entrance and exit slits, and working at a predetermined magnification are disclosed which provide improved optical performances by a correction of the odd terms of the wavefront aberration. In one group of instruments the fixed angle $2\theta$ between the entrance and the exit beams is 90° and the magnification 1. In another group, grazing incidence instruments are considered, $2\theta$ being equal to 166°.

12 Claims, 12 Drawing Figures

MONOCHROMATORS

This is a continuation of application Ser. No. 713,200 filed Aug. 10, 1976, now abandoned.

BACKGROUND OF THE INVENTION

As is well known, there are several types of monochromators. The SEYA-NAMIOKA device is of particular interest beacuse the entrance and exit slits are fixed and the grating is also fixed with respect to the slits, the grating being subjected only to rotation in order to scan the spectral range of interest. However, this instrument suffers from a very severe constraint in that the angle $2\theta$ between the axes of the two slits is fixed (approximately 70°30') if the instrument is to have reasonable resolution.

In my copending application Serial No. 537,460, now U.S. Pat. No. 4,036,558 a continuation-in-part of Ser. No. 277,857, filed Aug. 4, 1972 and now abandoned, a technique is disclosed by which the angular constraint of the SEYA-NAMIOKA mounting is removed while at the same time improving the optical performance by achieving increased resolution and luminosity.

Basically, these improvements are achieved by a second order focusing condition in which aberration terms of higher order are compensated by the use of phase balancing and of image-evaluation criteria, involving shifts off of the Gaussian image plane as a function of aberrations of higher order.

In my copending application Ser. No. 497,940, now U.S. Pat. No. 3,973,850 filed Aug. 16, 1974 even further optical improvements are achieved. Specifically, a technique is disclosed which involves determining the physical parameters of the mounting using a classical grating (i.e. a spherically concave grating having parallel and equidistantly spaced grooves) based upon the aforesaid second order focusing condition. Then, using these same physical parameters the classical grating is replaced by a holographically formed grating in which the physical parameters employed in the holographic recording of the grating are used at least partially to correct for residual astigmatism.

Basically, the technique involves implementation of Fermat's principle:

$$\frac{\partial F_1}{\partial w} + \frac{\partial F_2}{\partial w} = 0$$
and
$$\frac{\partial F_1}{\partial l} + \frac{\partial F_2}{\partial l} = 0$$

where $F_1$ and $F_2$ respectively are the optical path contributions associated with the classical grating and with the holographic formation of the substituted grating, and where $w$ and $l$ respectively are the Cartesian coordinates with respect to the center of the grating perpendicular and parallel to the axis of grating rotation. The aforesaid second order focusing condition is equivalent to $\partial F_1/\partial w = 0$. Therefore, the conditions $\partial F_2/\partial w = 0$ and $$\frac{\partial F_1}{\partial l} + \frac{\partial F_2}{\partial l} = 0$$

are employed to determine physical positions of the laser point sources used holographically to form the substitute grating so that phase variation is generated over the holographic grating which at least partially balances the residual astigmatism associated with the classical grating. It being well known that astigmatic correction leads to increase in the principal coma terms, the aforesaid conditions may also be employed partially to correct these coma terms. Because there is improved optical performances with respect to astigmatism and coma, a further increase in resolution and luminosity is achieved with respect to the mounting disclosed in the first mentioned applications.

There are many instances where still further improvements are needed. For example, in vacuum ultraviolet (VUV) diagnostics of plasma, i.e., as generated by a Tokomak machine, Doppler and Stark broadening measurements of line widths as a function of time lead to ion temperature and ion number density determinations. Also, determination of electronic temperature and relative species number densities can be performed using line ratio techniques. In the former cases, high resolution is required and in all of the above cases disymmmetrical broadening of the image due to insufficient optical performance of the instrument must be avoided. In spectroscopic devices employing concave diffraction gratings, this latter objective can be attained only if coma as well as astigmatism is well corrected. Pieuchard et al [see French patent 6908883, U.S. Pat. No. 3,628,849, Jobin et Yvon's catalogue: Holographically Produced Diffraction Gratings- Technical Guide, Ordering Information, and Grating Lists (1972), G. Pieuchard and J. Flammand: Final Report of Jobin et Yvon to the Goddard Space Flight Center, NASA (1972), J. Cordelle, J. Flammand G. Pieuchard and A. Labeyrie: Optical Instruments and Techniques, Ed. J. Home Dickson, Oriel Press, Newcastle, (1970) p.117] have employed holographically formed gratings using the stigmatic Weierstrass points of the sphere to obtain stigmatic correction at wavelengths proportional to the laser wavelength used holographically to form the grating. Because the lowest usable laser wavelength is about 4886Å, it is impossible to use this type of solution in the spectral range of 200–2500Å which is of paramount interest. Moreover, such solution is not adapted to construct a SEYA-NAMIOKA type instrument, i.e., one having fixing entrance and exit slits and a grating which is also fixed except for rotation to scan the spectral range of interest.

In the realm of grazing incidence instruments, monochromators have been constructed with classical gratings as well as toroidal gratings having parallel and equidistantly spaced grooves [R. J. Speer, D. Turner, R. J. Johnson, D. Rudolph and G. Schmahl, Appl. Opt. 13, 1259 (1974]. In such type of devices, either the exit slit or the grating must move on the Rowland circle, requiring very complex mechanical mounting and suffering from the severe disadvantage that the exit beam direction is not fixed. Greiner as well as Namioka [H. Greiner and E. Schaffer, Optik, 16, 288,350 (1959) and T. Namioka, J. Opt. Soc. Am., 50, 4(1960); 51, 13,(1961)] have investigated the SEYA-NAMIOKA mounting using a toroidal grating with parallel and equidistantly spaced grooves. However, such instruments do not allow investigation of wavelengths below about 200Å because it is necessary to increase the angle $2\theta$ with respect to the angle of 70°30' characteristic of the SEYA-NAMIOKA mounting in order to increase the reflectivity of the instrument. By using a toroidal grating having a non-uniform groove distribution, Lepere [D. Lepere, Nouv. Rev. Opt., 6, 173 (1975)] has proposed a SEYA-type instrument having an angle of 142° between the entrance and exit beams, allowing the possibility of investigating wavelengths down to about 150Å. In my copending application Serial No. 497,940, filed Aug. 16, 1974 the possibility of designing grazing incidence monochromators involving a simple rotation of spherical or toroidal grating has been also pointed out but the solutions are not restricted to a specific $\theta$ value. In particular, more grazing incidence monochromators can be designed, which are very useful for laser plasma diagnostics.

BRIEF SUMMARY OF THE INVENTION

It is of concern herein to provide certain specific spectroscopic devices which overcome difficulties existent in the prior art. In one aspect, the present invention relates to the discovery that by fixing the magnification of the instrument (i.e., the ratio between the spacing between the exit slit and the grating and the spacing between the entrance slit and the grating) and relating this magnification to the angle $2\theta$ between the entrance and exit beams in a SEYA-type of mounting, significant improvements in optical performance may be effected.

Basically the second order focussing condition is always used, but the object and image distance are no more determined as in the last applications, in function of wavelengths for which the foresaid equation must be solved. The variations of the aberrations in function of the magnification and of $2\theta$ are first considered in order to select particular configuration having specific optical properties.

For example, by using a magnification equal to 1 with $2\theta$ equal to 90°, a stigmatic, essentially coma-free instrument may be constructed. Finally the proper object and image distances are chosen in order to minimize the defect of focus.

For grazing incidence instruments, the present invention leads to the design of vacuum ultraviolet monochromators whose characteristics and performances are very close to those which can be obtained by the process described in my copending application Serial no. 497,940 filed Aug. 16, 1974. However, two new grazing incidence configuration using cylindrical grating, working at predetermined magnification are described.

In the following detailed description, reference is made to various equations and/or conditions or relations, all of which are incorporated herein under the heading "Appendix" at the end of the descriptive specification.

DETAILED DESCRIPTION OF THE INVENTION

Figure 1:
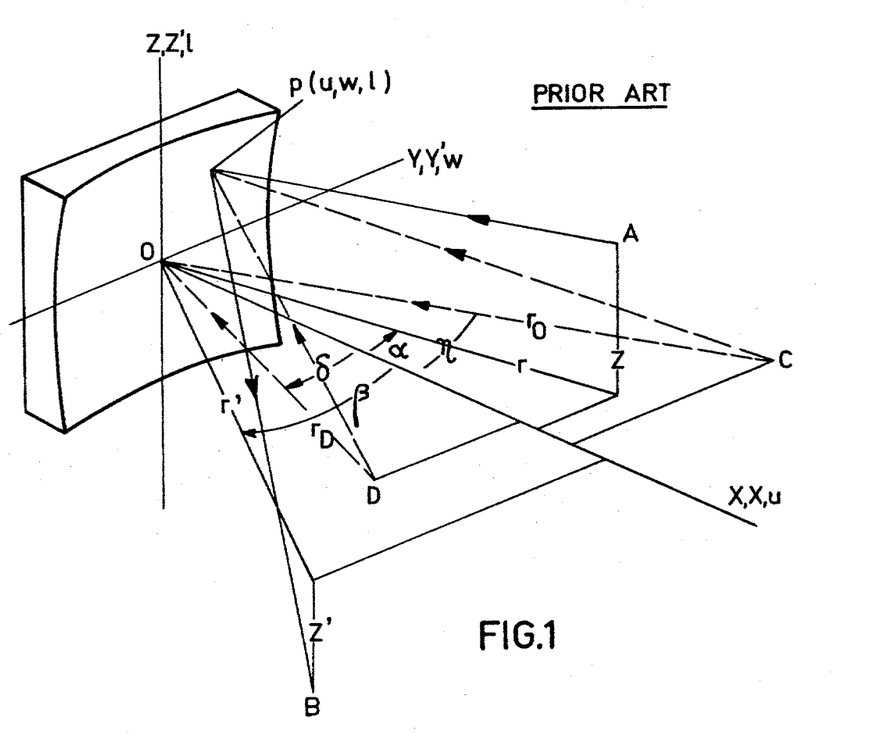
FIG. 1 is a view showing a grating blank and the coordinate system associated therewith.

Reference is had first to FIG. 1 which illustrates a toroidal grating blank 10 in association with a cartesian coordinate system wherein the origin 0 lies at the geometrical center of the blank, at which the X axis is normal. The radius of curvature of the blank in the X-Y plane is represented by R, with tR being the radius of curvature of the blank in the X-Z plane. Following Habar [H. Haber: J. Opt. Soc. Am. 40 (1950) 153], the equation for the torus as expressed in the cartesian coordinates U, W and l represented in FIG. 1 is given by equation (1), noting that w and l respectively are the pupil coordinates perpendicular and parallel to the Z axis. Further development of equation (1) yields equation (2) which is a vertex equation for the torus in the form of a power series, excluding members of the fifth and higher orders. The equation is a general one since if $t=1$, the grating blank is spherically concave.

If the grating blank is provided with classical rulings, the grooves are the intersections between the torus and a family of planes parallel to the x-z plane, the grating constant d which is the distances between adjacent planes being equal and there being $n=1/d$ number of grooves per mm.

An equivalent grating can be produced by interference between plane wave fronts of two laser beams included equally with respect to and on opposite sides of the grating normal. In general, if C $(r_d,\delta)$ and D$(r_d,\delta)$ in FIG. 1 represent the positions of two coherent point light sources lying in the X-Y plane, conventional photo resist technique allows the grating grooves to be formed according to the relation given in equation (3), where $\lambda_0$ is the wavelength of the coherent point light sources. Since, in FIG. 1, the distances $r_c$ and $r_d$ are finite, the grooves are formed along intersections between the blank and a family of hyperboloids of revolution whose revolution axis and foci respectively are the line connecting points C and D and the points C and D.

If, A, B and P respectively are a point in the entrance slit which slit is at distance r from the orgin 0, the image of that point in the exit slit which slit is at distance r' from the origin 0, and a point on the $n^{th}$ groove from the origin 0, ad assuming positive-working photo resist, the light path function F for the ray APB is given by equation (4). Introducing cylindrical coordinates, such that equation (4a) and (4b) prevail, and substituting equations (2), (3), (4a) and (4b) into equation (4) and carrying out a power series expansion, one arrives at equation (4c) provided that the distances from points C and D to the origin O are integer multiples of the recording wavelength $\lambda_O$. Equation (4c) can be summarized in the form of equation (5), where $F_0=F(w=0,l=0)$ and $C_{ij}$ and $D_{ij}$ are the aberration coefficients associated respectively with the grating and with the two recording point sources C and D.

According to Fermat's principal, in order to ensure that PB is actually a diffracted ray of wavelength $\lambda$ corresponding to the incident ray AP, F must be stationary with respect to small displacements of P such that the partial derivatives $\partial F/\partial w$ and $\partial F/\partial l$ are equal to zero, see equations (6) and (7). If equations (6) and (7) could be satisfied simultaneously by any pair of w and l for the fixed point B, then B would be the point of perfect focus.

Conventionally, the light path function has been computed with respect to the central or paraxial rays only, that is, by determining $F_0$ where w and l are equal to zero. This convention has been followed because when considering the horizontal focus, $\partial F/\partial w$ decreases with both w and l. The associated image plane is obtained by requiring the main term $C_{02}$ of $\partial F/\partial w$ to vanish. The magnitude of the wavefront aberration $\Delta(w,l)$ is then evaluated from a reference sphere centered at the middle of the gaussian image of point A.

Indeed, such convention has been followed by Namioka and Pieuchard as specified hereinabove. In particular, solutions have been found for the Rowland circle mount and for a new type of mounting employing a holographically-formed grating, see U.S. Pat. No. 3,628,849. The Rowland circle mounting requires a very complex and expensive scanning mechanism whereas the latter does not provide high resolution.

According to my aforesaid copending applications, the Rowland conditions are ignored and phase-balancing of the aberrations together with image quality criteria is effected. The purpose is to locate the point B in the image space such that the deformation of the wave front aberration from the corresponding reference sphere is a minimum. Shifts, off the gaussian image plane, as a function of the amount of the aberrations are then introduced in order to minimize the aberrations over all of the exit pupil. In evaluating tolerances for the residual aberrations, the optimum focus is assumed to be determined by maximum irradiance in the image plane at the best plane of focus.

Mathematically, the method leads to a determination of the object and image distances r and r' in such a way that for a proper value of the illuminated grating area, the even terms of the wave front aberration, as given by equation (8), are reduced to the form given in equation (9). In equation (9), the terms $C_2w^2$ and $D_2w^2$ characterize the defects of focus associated respectively with the image plane (i.e., due to the physical parameters of the mounting) and with the recording point sources C and D by which the grating lines are formed holographically.

The optimal positions of the points C and D must take into account the aperture of the mounting in order to minimize the fourth order aberration terms $D_{ij}(i+j=4)$ related to the holographic formation of the grating. Then, any terms of $\Delta'(w,l)$ which do not involve w do not introduce a broadening of the image if the astigmatic focal line is in focus along the direction of the spectrum.

To reduce the odd terms of the wave front aberration, as given in equation (10), so that they take the form of equation (11), a lateral displacement $C_1w$ of the center of gravity of the spectrum line, such as occurs with coma-type aberrations, is introduced. The terms $C_{10}l$ and $C_{11}wl$ characterize the spectrum line curvature which cannot be avoided even with holographically-formed gratings.

Application of Fermat's principle yields the grating equation (12), the nominal number n of grating lines per mm, the magnification in the vertical plane and the magnification in the horizontal plane being given in equations (13), (14) and (15) respectively. The horizontal focussing condition, taking terms in $w^2$ in equation (9) and equating them to zero, is given by equation (16), and the position of the maximum intensity of the diffracted ray $\lambda+\Delta\lambda$ will appear in direction $\beta+\Delta\beta$ so as to define $C_1$ as in equation (17). With these conditions prevailing, the total aberration function is as given in equation (18).

Then, the introduction of image evaluation criteria allows the optiumum width $W_0$ and height $L_0$ of the grating area as well as the exact values of $C_1$, $C_2$ and $D_2$ to be obtained.

For small phase errors $(<<\lambda)$ an expression of the Strehl criterion is used in which the irradiance distribution is evaluated for a line object and a rectangular pupil.

For large phase errors $(>\lambda)$ a quality factor Q is employed, based upon the Hertzberger criterion. The large phase error case occurs for example with mountings employing normal incidence (i.e. small $2\theta$ values) with large aperture, or in grazing incidence mountings. The limiting resolution $<\alpha\lambda>$ is related to the quality factor Q as given in equation (19) where $W_0=2a$ and $L_0=2b$. In order to minimize the limiting resolution by a proper choice of the reference sphere, $C_1$, $C_2$ and $D_2$ are determined so that the right-hand side of equation (19) is minimized. For large phase errors, then, the generalized focussing condition takes the form of equation (20), in which it will be noted that for classical mountings working in the gaussian image plane, the right-hand side vanishes.

Equation (20) may be employed to provide optical improvement of a mounting by utilizing the recording parameters $\rho C$, $\rho D$, $\nu$ and $\delta$ which define the defect of focus $D_h$ introduced by the non-uniform spacing of the holographically-formed grating lines. That is, equation (20) may be expressed by the two equations (21) and (22) which, if simultaneously satisfied, may effect optical improvement in a given mounting.

On the other hand, for a toroidal grating having classical or uniformly spaced and parallel lines, stigmatic spectral images may be produced if equation (16) and equation (23), obtained from equation (4c), are simultaneously satisfied. By solving for $H_0$ in equation (21) and substituting in equation (23), the value of t is connected with angles of incidence and diffraction, as given in equation (24), which value controls the position of two stigmatic points, in the most general case, associated with the pairs of angles $\alpha^*, \beta^*$ and $-\alpha^*, -\beta^*$. The pairs of angles $-\alpha^*, -\beta^*$ and $\alpha^*, \beta^*$ which also satisfy equation (24) have the same geometrical and optical significance as the former pairs. Of practical value, of course, are mountings for which astigmatism has a value approximately independent of the wavelength $\lambda$.

Returning to consideration of those mountings employing a toroidal grating having non-uniform distribution of holographically-formed lines, a linear correction of residual astigmatism can occur, at a wavelength $\lambda_a$ if equation (25) is satisfied.

From the above, it will be noted that equations (13), (22) and (25) can be used to determine three of the four recording parameters defining the location of the two point sources C and D. This leaves one degree of freedom which can be utilized to reduce coma type aberrations which, as is well known, are increased by astigmatism-balancing procedures, particularly the $C_{03}w^3$ and $C_{21}l^2w$ coma terms which are important in connection with concave gratings. Since it is not generally possible simultaneously to correct these two coma terms, correction must proceed on the basis of optimal conditions which minimize image broadening. From the solution of the image evaluation as defined in equation (19), as is expressed in equation (26), it is clear that the various aberration terms do not have the same importance. For this reason, the fourth condition leading to the determination of the parameters of the point sources C and D cannot be given as a general case. Particular solutions following the above procedure are given in my copending application Ser. no. 497,940.

For a given grating (R, n, w and L being fixed) and an arbitrary chosen $\theta$ value, the object and image distances are derived from Eq. 21 which must be satisfied for 2 wavelengths inside of the wavelengths spectral range of interest. Eq. (13), (22), (25) and (26) are then solved for the aforesaid object and image distances.

The above constitutes a brief review of my aforesaid copending applications.

In the present invention although, basically, the same equations [13, 21, 22, 25, 26] are used, they are solved, for a given grating, by first choosing a particular correlation between $2\theta$ and the magnification $\Gamma$ to minimize the odd terms of the above front aberration as given in equation (10) or (11). For the given grating, the selected $\Gamma$ and $\theta$ values, the second order focussing condition is then solved. Such a process leads to the design of new monochromators with improved optical performances.

To illustrate certain principles according to the present invention, a toroidal grating having holographically-formed grooves of non-uniform distribution is first considered. In order holographically to form the grating lines, four simultaneous equations are required to be developed in order to determine the four recording parameters. One of these equations, identified herein as the first condition, must be equation (13).

The second condition is related to astigmatism correction. In the most general case, the height of astigmatism $Z_a(\lambda)$ is given by equation (27), in which L is the illuminated height of the grating and e' is the reduced image distance. For a given grating, $D_{20}$, m (the order of diffraction) and $\lambda_a$ are constants whereas $C_{20}$ and $\lambda$ are functions, for a given mounting, of $\alpha$ and $\beta$. For a monochromator of the SEYA type, involving only a rotation $\lambda$ of the grating, the relationships identified as (28) obtain for the $-1$ order (m=$-1$), $2\theta$ being the fixed angle between the incident and diffracted beams. Then, for a given monochromator or mounting in which R, n, e, e' and $\Gamma$=e/e', are fixed, the height of astigmatism as expressed by equation (29) is a function of $\gamma$ only. In equation (29), p=$-1$ for mountings working in negative orders and p=1 for mountings working in positive orders.

For each particular monochromator, the right side of equation (29) must be minimized over all the interval 0–$\gamma$m which represents the angular rotation of the grating employed to scan the spectral range of interest.

According to this invention, a very simple rule has been found which is applicable to any type of toroidal, holographically-formed grating of the SEYA type. This rule involves the arbitrary factors given at (30), in which $\gamma_t$ is the angle at which astigmatic correction is effected as a function of the toroidal characteristic of the grating and where $\gamma$h is the angle at which astigmatic correction is effected as a function of the recording parameters employed in the holographic formation of the grating grooves. ($\gamma$t characterizes the toroidal correction and $\gamma$h characterizes the holographic correction with non uniform grooves distribution).

Equation (29) then takes the general form of equation (31) where $\xi(\gamma t;\gamma h)$ is defined in equation (32). Equation (32) is obtained by substituting the factors (30) into the bracketed portion of equation (29) and substituting the equality $\cos^2\gamma+\sin^2\gamma=1$.

It is now possible to determine the optimum values of t and $d_{20}$ by determining the values of $\cos_{\gamma t}$ and $\sin_{\gamma h}$ which minimize equation (31) over all the range 0–$\gamma$m of $\gamma$, noting that this can be done regardless of the values of R, n, $\theta$, e and e'.

Figure 3:
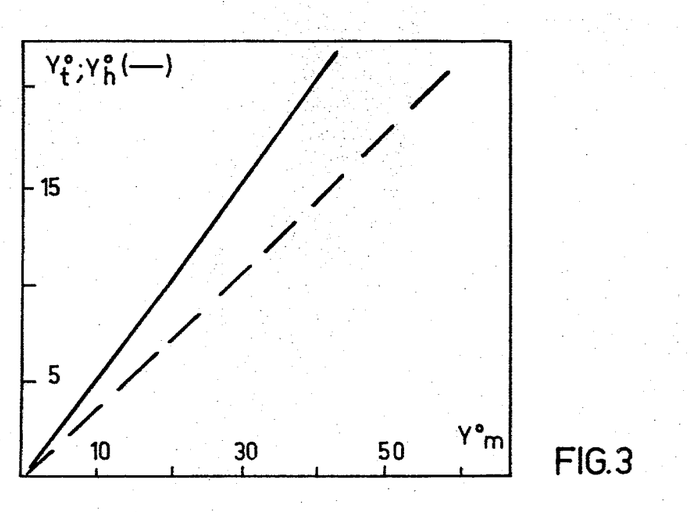
FIG. 3 is a graph illustrating certain principles of this invention.
Figure 4:
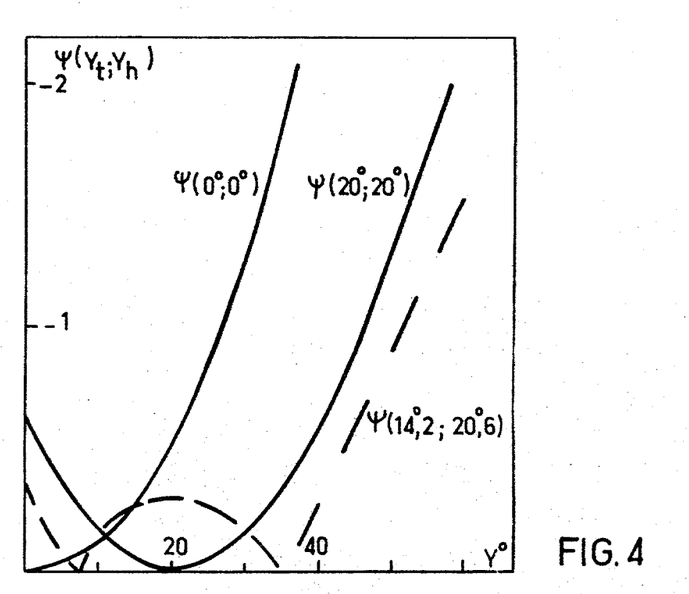
FIG. 4 is a graph illustrating certain principles of this invention.

To illustrate, FIG. 3 graphs the variations of $\gamma$t and $\gamma$h which minimize the residual astigmatism in the interval 0–$\gamma$m. In FIG. 4, three solutions are graphed for the function $\psi(\gamma t;\gamma h)$ as a function of the interval 0–$\gamma$m. One solution is for $\gamma t=0°$ and $\gamma h=0°$; another is for $\gamma t=20°$ and $\gamma h=20°$; and the last is for $\gamma t=14°2'$ and $\gamma h=20°6'$ which is the optimized condition for $\gamma m=40°$.

Figure 5:
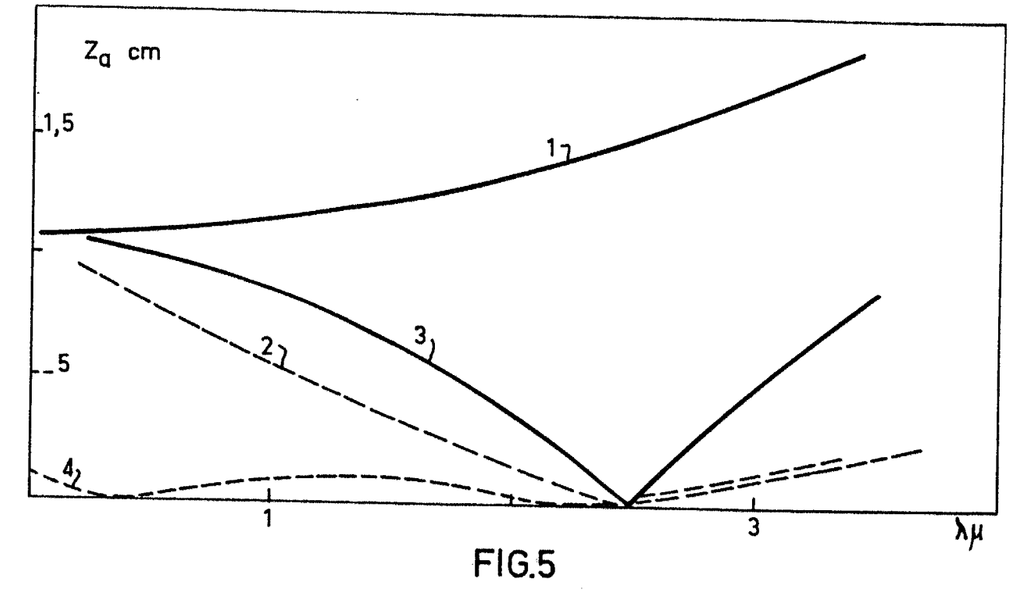
FIG. 5 is a graph illustrating certain principles of this invention.

From the optimized condition according to FIG. 4, it is sufficient for practical purposes to relate $\gamma$m, $\gamma$t and $\gamma$h as given by (33), and the equation for establishing the second condition is given by equation (34). To illustrate practical examples for the following conditions:

R=1.5 m
n=3600 lines per mm
$\theta=33°$ 'r'=Re'=1286.8 mm
R=Re=1235.4 mm, reference is made to the graph shown in FIG. 5 representing the height of astigmatism in function of the wavelength for various gratings wherein 1 represents a spherically concave grating having equidistantly spaced, parallel grooves, 2 represents a spherically concave grating having non-parallel holographically-formed grooes, 3 represents a toroidal grating having parallel, equidistantly spaced grooves, and 4 represents a toroidal grating having holographically-formed non-parallel grooves and corrected for astigmatism according to this invention.

The third condition according to this invention involves correction for the dissymmetrical broadening of the image arising from the $\zeta 2$ and $\xi 2$ comma terms, see equation (26). Equation (26') defines the condition necessary for $\xi=0$ for any wavelength $\lambda$. Inasmuch as $D_{21}$ is a constant, for a given grating, the ratio $C_{21/\gamma}$ must also be independent of $\lambda$, i.e., of $\gamma$ if equation (26') is to be satisfied. Following the new process, purpose of the present invention, by expressing this ratio as a function of $\Gamma$, $\theta$ and $\gamma$ (by taking into account equations 4c, 15 and 28), it was found that equation (35) prevails if $\theta=45°$ and $\Gamma=1$, see (36). Then, defining $d_{21}=2R^2D_{21}$ and determining $D_{21}$ from equations (4c), the third condition is defined by equation (37) which, if satisfied, will cause the monochromator to be free of the $C_{21}l^2$w comma term at any wavelength $\gamma$.

Under the same circumstances, i.e., $\theta=75°$ and $\Gamma=1$, the second coma term takes the form of equation (38) where $d_{03}=2R^2D_{03}$. If $d_{03}$ and $d_{21}$ are related as set forth in (39), with P being defined as in (40) where $\gamma 03$ is the angle at which the $w^3$ coma term is minimized, equation (38) takes the form of equation (41). In order to minimize the right-hand side of equation (41) over all the interval 0–$\gamma$m, $\gamma 03$ may be chosen equal to m/2. However, in special cases, i.e. for plasma diagnostics which occur generally at a particular wavelength A, the relationship given by equation (42) may be used.

This third condition leads to a situation where, for large aperture devices, the $l^2w$ coma term may be made equal to zero for all wavelengths over the interval $0-\gamma_m$ whereas the $w^3$ coma term is greatly reduced in this interval. As a practical matter, this is accomplished by selecting among those solutions to equations (13), (34) and (37), and the equation (43) hereinafter given, those which also satisfy the relations (39) and (40).

The fourth condition is that which relates to the horizontal focussing condition given by equation (43).

Figure 2:
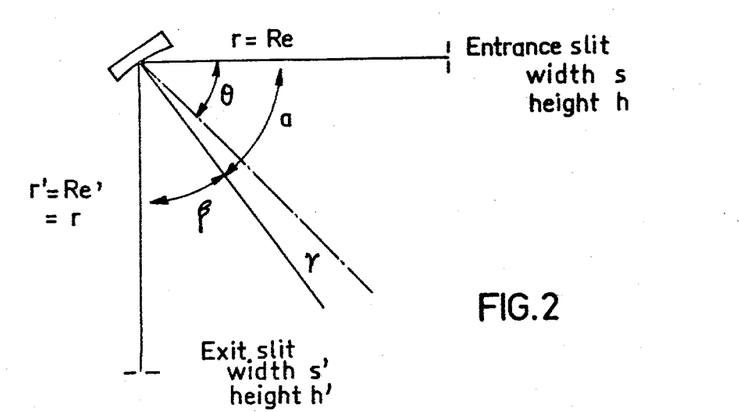
FIG. 2 is a view illustrating an embodiment of the invention.

For the particular case of a toroidal grating having holographically-formed grooves which are non-uniformly spaced and non-parallel, in a SEYA-type mounting with $\Gamma = 1$, $m = \pm 1$ (simple rotation of the grating in the exit slit direction $m = +1$, or in the entrance slit direction $m = -1$), $2\theta = 90°$ as in FIG. 2 wherein the recording point sources C and D (FIG. 1) are located such that equations (13), (34') and (43') are met, with $e' = e - 2t \cos (\gamma m2.85)$, the monochromator will be characterized by perfect correction of astigmatism at two wavelengths in the spectrum of interest, by perfect correction of the $l^2w$ coma term at all wavelengths in the spectrum of interest, and by partial correction of the $w^3$ coma term over the spectrum.

EXAMPLE I

In this example a toroidal grating having parallel and equidistant grooves is first considered, the mounting being as shown in FIG. 2, with the parameters $\theta = 45°$; $n\lambda = \sqrt{2} \sin\gamma$; $e = 3'$; and $m = \pm 1$. Obviously, the two recording point sources C and D, FIG. 1, are at infinity and their angular positions are given by equation (13).

From the astigmatism point of view, equation (34') in this instance reduces to $e = \sqrt{2} t$ and, from the first order focussing condition given in equation $\cos^2\alpha + \cos\beta = \sqrt{2} [H_0 + H(\lambda)]$ considering that $e \sqrt{2} = 1$. Further, the optical aperture in horizontal plane as given by equation (45) reduces to $W_0/R$.

If the mounting is restricted to small values of $\gamma_m$ such that $\gamma_m \leq 5°$, then the coma terms are as given in equations (46) and (47), and these aberrations introduce a broadening $\Delta\lambda_c$ of the image of a point object. The corresponding limiting resolving power $R_c = \lambda/\Delta\lambda c$ can be determined either on the basis of the Strehl criterion (for small phase errors) or on the basis of the quality factor Q, equation (19) for large phase errors. It can be shown for the small phase error case that if $R_c\Omega^2 \leq 10.9$, the remaining coma terms do not affect the image profile if equations (48) and (49) are satisfied.

Figure 6:
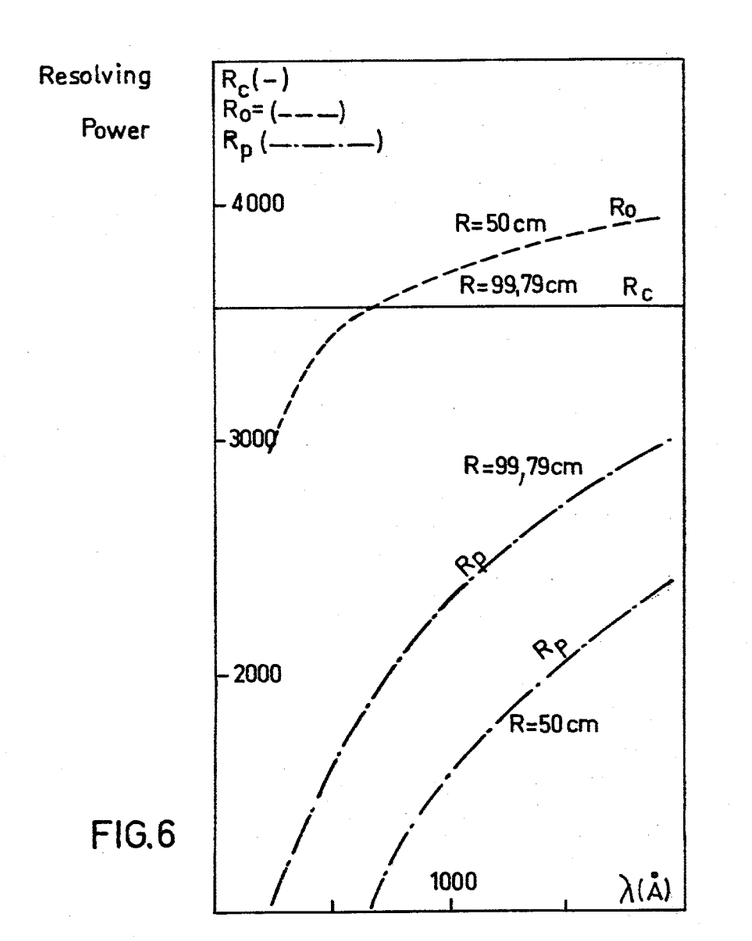
FIG. 6 is a graph illustrating certain principles of this invention.

Equation (48) is very important because it is possible to predict the performance of a mounting having a given aperture $\Omega$ (see FIG. 6, hereinafter described), what the value of R may be since the other aberration terms will also be proportional to $\Omega^2$. This property arises from the fact that in the practical device considered here, the coma terms are only proportional to $\gamma$.

Another way of employing the quality factor Q of equation (19) is to apply it to the instrumental defocussing given by equation (21') arising from the use of fixed object and image distances. In this case, it is sufficient to satisfy equation (50), where $R_d$ is the limiting resolving power correlated with the instrumental defect of focus. Of course, $R_c$ and $R_d$ must remain equal or at least of the same order of magnitude.

For $\gamma_m = 5°$, $\epsilon(\gamma) (\sin \gamma)^{-1}$ can be minimized for the value of $e^{-1}$ given in equation (51) since $\epsilon(\gamma)$ is the sum of two terms one of which is proportional to $\cos^2\gamma_0(\cos$ $0 - \cos \gamma)$ and the other of which is proportional to $H(\lambda)$ which is always of positive value.

Considering a practical case using an entrance slit width S of $10\mu$, computed results show that equation (50) can be fulfilled over all the interval of $\gamma$ provided that $\gamma_m \leq 5°$. The mean value limiting resolving power $R_0 = \lambda/<\Delta\lambda>$ remains at least equal to $R_c$, as will be seen in FIG. 6, where ordinate represents the variously estimated resolving power and abscissa represents the wavelength $\gamma$.

If large values of $\gamma_m$ are considered, it can be seen from equation (47) that the $C_{03}w^3$ coma term decreases as $\gamma$ increases so that at the limit $\gamma = 45°$, $C_{03}$ is equal to zero and $R_c\Omega^2$ tends to $12.65\Omega^2$. It will be seen then that the optically corrected spectral range can be extended providing that the condition of equation (50) is fulfilled. In fact, by changing the values of e, the spectral range in which the instrumental defect of focus can be neglected may be modified. A limiting resolving power $R_0$ of about $10\Omega^2$ can be obtained in the range $\gamma^* \leq \gamma_m^*$ with $\gamma^* < \gamma_m \leq \gamma_m^*$, at an optimum e value equal to $\sqrt{2}/2(\cos \gamma_0)^{-1}$ as deduced from equation (50). $R_0$ is the limiting resolving power corresponding to a point object. In fact, the limiting resolving power associated with a point source must take into account not only the broadening of all the coma terms but also of all the other aberrations $R_0 = \lambda/<\Delta\lambda>$  $R_c$ is the limiting resolving power corresponding to the broadening $\Delta\lambda_c$ due to the coma terms only. $R_c = \lambda/\Delta\lambda_c$ $R_p$ is the resolving power taking into account the width of the slit. This figure shows that, without any computations, it is possible to estimate the limiting resolving power by using equation (48).

Thus, by using the focalization process described in my applications Ser. No. 537,460 and 277,857, a coma free stigmatic monocromator having an optical aperture $\Omega$ in a horizontal plane, a nominal dispersion d given in Å/mm, a mean value limiting resolving power $R_0$ at least equal to $8.9^2$, and an optically corrected spectral range corresponding to $0-\lambda m(Å)$ can be designed provided that the following parameters are used:

1. A toroidal grating with straight, parallel and equidistant grooves:
2. $n = 10^7 \sqrt{2} \sin 5° \lambda_m^{-1}(Å)$ lines/mm
3. $R = 10^7/nd$ mm
4. $t = \frac{1}{2}$
5. $W_0 = R\Omega$
6. $L_0 = 0.64437 W_0$
7. $2\theta = 90°$
8. $e = e' = \cos 45° = 0.708077$ The grating may be rotated either in the entrance slit direction (negative spectral orders) or in the opposite direction (positive spectral orders).

Moreover, this monochromator may be optically corrected from $\gamma = \sqrt{2}/n \sin \gamma^*$ to $\gamma_m = \sqrt{2}/n \sin \gamma_m^*$ producing that the object and image distances e and e' are equal to $\sqrt{2}/2(\cos \gamma_0)^{-1}$ where $\gamma_0$ is deduced from the tolerance of instrumental defocussing arising in the involved spectral range.

To illustrate, the following example is cited.
$2\theta = 90°$
$n = 600$ lines/mm
$\Omega = 1/20$
$R = 997.9$ mm
$W_0 = 49.89$ mm
$L_0 = 32.16$ mm
$t = \frac{1}{2}$ $r = R_e = r' = R_e' = 705.62$ mm FIG. 6 shiows $R_0$ and $R_p$ values which characterize the practical resolution for a 10μ entrance slit. Until 2000 Å the mounting is well corrected, the practical resolution being 0.32 Å at 500 Å and 0.66 Å at 2000 Å, the corresponding values of the height of astigmatism being 0.74 and 1.44 mm.

If R is reduced to a value of 50 cm, the same limiting resolving power is obtained with the practical resolution being 0.5 Å at 500 Å and 0.84 Å at 2000 Å, but the height of astigmatism is now divided by a factor of about 2 since the image distance has been reduced by about this factor. Thus, by reducing the volume of the instrument by a factor of about 4 (e and e' equal to 353.55 mm as opposed to 705.62 mm) the practical resolution is degraded by a factor of only 1.3 to 1.5.

Figure 7:
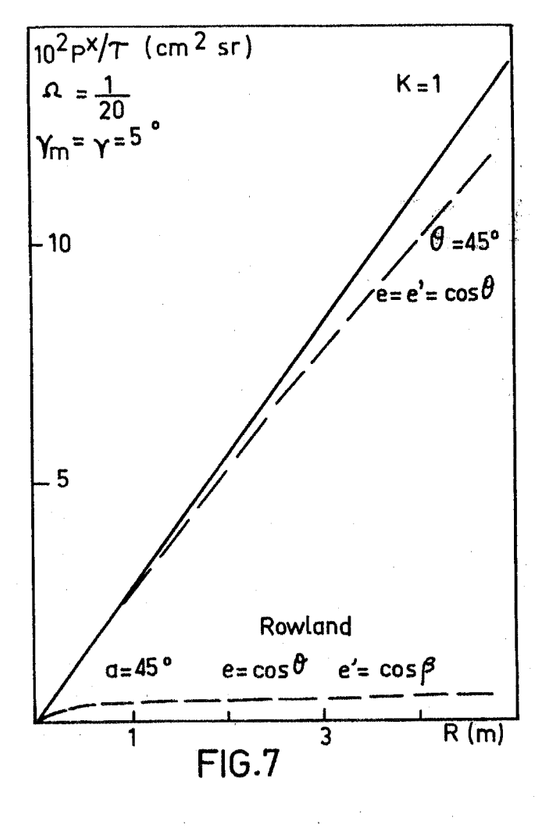
FIG. 7 is a graph illustrating certain principles of this invention.

Inasmuch as the luminosity resolution product P* takes the form given in equation (52), where $\tau$ is the efficiency of the grating and K is a factor characterizing losses in intensity arising from astigmatism, and h' is the height of the exit slit, the P* value, for a given Ω, n and λ, is proportion to KR. FIG. 7 is a graph of the ratio P*/τ as a function of the radius of curvature B for three mountings, one for a perfect stigmatic 90° mounting (K=1), for the above example where $\gamma_m = 5°$, and for a classical Rowland circle mounting. This Figure illustrates the gain in performance arising from the use of a toroidal grating in the 90°, unity magnification monochromator as in FIG. 2.

EXAMPLE II

In this example, a toroidal grating having a non-uniform groove distribution is considered. In this case, the two recording points C and D, FIG. 1, are located at finite distances from the grating, their angular positions again being given by equation (13). As in Example I, $\theta = 45°$, $e = e'$, $m = \pm 1$ and $n\lambda = \sqrt{2} \sin \gamma$.

The $\rho_c$ and $\rho_d$ values are in the general case given by equations (34'), (37') and (43') and the corresponding $R_c$ value is given by equation (53).

The particular case where $\gamma_m = 5°$ is first considered. In this case, the $D_{04}$ value computed from equation (43') is nearly constant, $\epsilon(\gamma)$ being equal to $\epsilon_0 \sin \gamma$ over all the interval 0–5° of γ because $e = e' = \sqrt{2}/2$ and $t = \frac{1}{2}$, i.e., $\cos \gamma_t = 1$.

Figure 8:
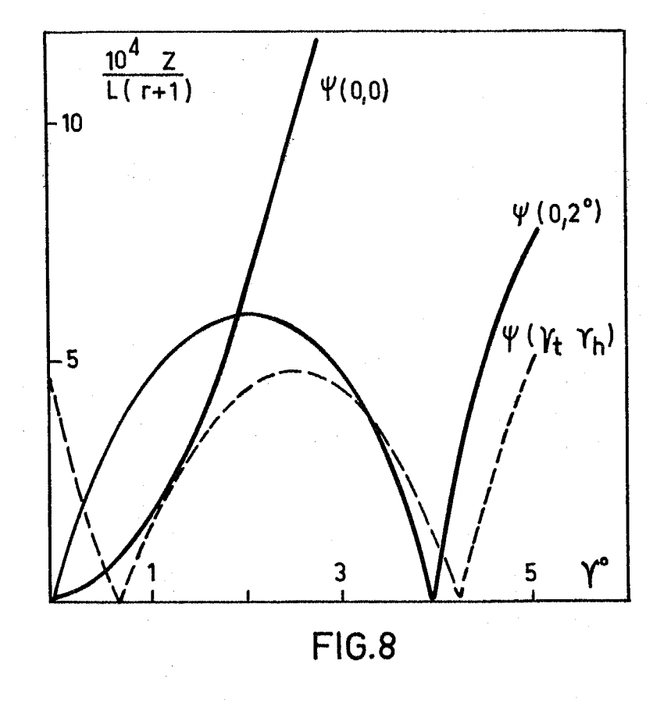
FIG. 8 is a graph illustrating certain principles of this invention.

The function $Z_a(\lambda)$ then takes the form given by equation (29'). FIG. 8 shows that if $\gamma_m \leq 5°$ and $\psi(\gamma^2) = \tan 2°$, the correction arising from $\cos \gamma_t = 1$ and $\sin \gamma_h = \tan 2° \sim \sin 2°$ is very close to the optimized conditions described by equations (30), (31) and (32). The mounting thus has the following characteristics:

$\theta = 45°$
$m = \pm 1$
$t = \frac{1}{2}$
$e = e' = \sqrt{2}/2$
$\sin \delta - \sin \eta = n\lambda_0$
$d_{20} = -2 \sin 2° m n \lambda_0$
$d_{21} = n\lambda_0 / e'^2$
$D_h = \sqrt{2}/2 n \lambda_0 \epsilon_0$ with the limiting resolving power $R_0$ being at least equal to the $R_c$ value given by equation (53).

Two particular cases arise for $2d_{03} = d_{21}$, where $R_c \Omega^2 \leq 6.325$ if:
$\delta = 45°$
$\eta = 45°$
$n\lambda_0 = \sqrt{2}$
$\lambda = \lambda_0 \sin \gamma;$ or if:
$\delta = 45°$
$\eta = 0$
$n\lambda_0 = \sqrt{2}/2$
$\lambda = 2\lambda_0 \sin \gamma$ In the case where the conditions (54) are simultaneously met, the corresponding value of the limiting resolving power is given by equation (55), from which it will be clear that the value of $R_c$ may be very high. To satisfy the conditions given by equation (54), the conditions given by equations (54-1), (54-2) and (54-3) must be met.

For a given value of $n\lambda_0$, solutions of equations (54-1)–(54-3) yield values of δ, η, t and e, and by employing equations (37') and (34'), values of $\rho_C$ and $\rho_D$ are obtained. Finally, as a function of P, that solution is selected which satisfies the focussing condition in the horizontal plane, i.e., equation (43').

However, to decrease the computing time, I have found that equations (54-1)–(54-3) are satisfied if $K_2 = -H/P$ and $K_2' = -H'/P$, which leads to equations (55) and (55'). The value of t is then determined by equation (56), and $\sin \gamma_h$ by equation (57). Then, by taking equation (43') into account, a very simple solution occurs if the condition (58) is obtained. In this case, the defect of focus $D_h$ generated by the hologram vanishes, but $\sin \gamma_h$ vanishes also. Despite the fact that astigmatism cannot be corrected for two wavelengths, this solution is very important because:

1. solutions can be determined very easily for any type of grating and they occur with wavelengths produced by presently available lasers,
2. the values of $\rho_C$ and $\rho_D$ are always positive,
3. the solution is stationary; the $D_h$ value varies very slowly around the optimum value of δ given by (58), which leads to optimal solutions in which $\sin \gamma_h$ is not equal to zero and for which $D_h$ remains sufficiently low (i.e., $< 2 \times 10^{-5}$),
4. the same holographically formed grating can be used in either the positive or the negative orders.

Following this technique, a practical example is as follows:
$2\theta = 90°$
n = 600 lines/mm
$\Omega = 1/20$
R = 99.79 cm
t = 0.3466
$W_0 = 49,89$ mm
$L_0 = 32.16$ mm
$r = R_e = r' = R_e' = 706.59$ mm
$\gamma_0 = 4879.86$ Å
$\gamma_m = 3000$ Å
$\delta = -\eta \approx 8°41'8''$
$\rho_C \rho_D \approx 1.6307$ To further illustrate, as n varies between 200–2000 lines mm and $\lambda_m$ varies between 500–4000 Å with e = 0.708077, t varies between 0.295–0.355 and $\rho_D$ varies between 1.618–1.851.

There is at present a growing need to extend the range of spectrophotometers towards shorter wavelengths (below 2000 Å). However, due to the well known technical difficulties encountered in the V.U.V. namely for the design of the beam splitter, most of the devices are limited in their use to a steadily or quasi-steadily emitting source. Indeed the beam splitter is either a chopper associated with two prisms, or an oscillating or vibrating (Jarel Ash device) mirror or a rotating cell. The only beam splitter designed to be adaptable to any type of light source is the spatial beam splitter described by M. C. Castex: Rev. Sci. Instr., 39 (1968) 331. It is composed of a plane reflecting mesh tilted with respect to the emerging light beam of the exit slit of a monochromator. The beam transmitted through the holes of the mesh strikes a plane mirror. Both the mesh and the mirror are made of aluminum-coated nickel and they are adjusted to have the same angle of reflection.

Figure 9:
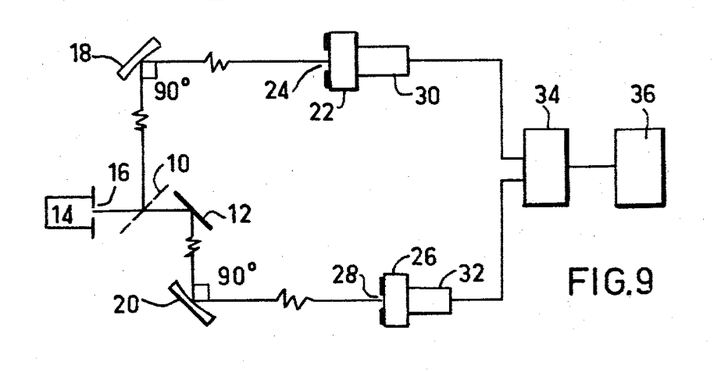
FIG. 9 illustrates another embodiment of this invention.

In FIG. 9, such a beamsplitter (double beam spectrophotometer) is shown, the mesh and plane mirror being indicated at 10 and 12, the source at 14 and the entrance slit at 16. The two beams are directed to the two holographically formed gratings 18 and 20 constructed according to the last example given above. A reference absorption cell 22 is located at one exit slit 24 and a working cell 26 is located at the other exit slit 28. The outputs of the photomultipliers 30 and 32 associated with the cells are applied to the logarithmic amplifier 34 which drives the recorder 36. By using a common drive mechanism for the two gratings 18 and 20, the beams leaving the monochromators have equal bandwidths.

By utilizing a common sine drive mechanism for the gratings as described in my application Ser. Nos. 277,857 and 537,460 (see FIGS. 9a) a constant wavelength difference of the two beams can be maintained throughout the spectrum. This difference can be calculated as follows: $\sin = D/L$ $$\lambda_1 = \frac{2}{n} \sin\gamma\cos\theta = 2\frac{\cos\theta}{n} \frac{D}{L} ; \left|\frac{\Delta\lambda}{\lambda}\right| = \left|\frac{\Delta L}{L}\right| ;$$

$$\Delta\lambda = \frac{2\cos\theta D}{n} \frac{\Delta L}{L^2}.$$

Figures 9A, 10:
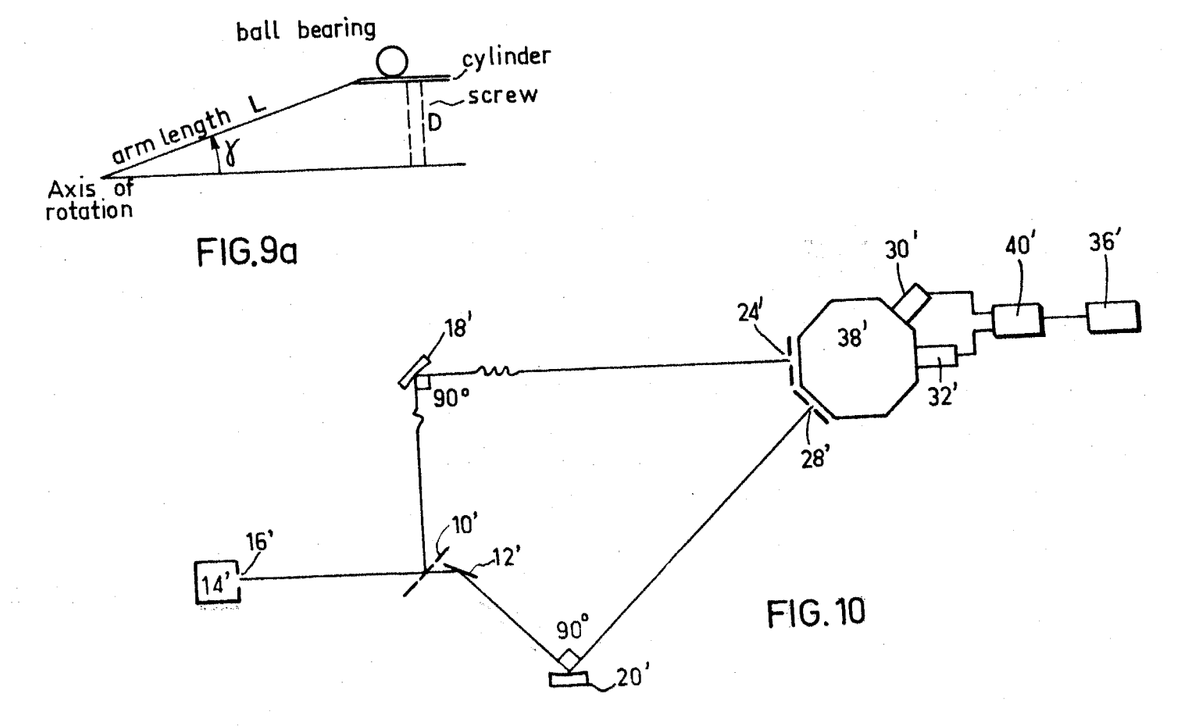
FIG. 10 illustrates another embodiment of this invention.

A constant $\Delta\lambda$ value is achieved for the same D value for a small variation of L. A self modulating derivative spectrophotometer can be corrected as shown in FIG. 10. In FIG. 10, the source 14' and entrance slit 16' direct the entrance beam to the beamsplitter 10', 12' and the two holographically-formed gratings 18' and 20' direct their beams to the equipath cell 38' through the exit slits 24' and 28'. The outputs of the photomultipliers 30' and 32' are applied separately to the substractor 40' which drives the recorders 36'.

If V($\lambda_2$) is the output obtained at the slit 24' and V($\lambda_1$) is the output obtained at the other slit 28', then the output $\Delta(\lambda)$ of the subtractor 40 is V($\lambda_2$)−V($\lambda_1$). If $\lambda_2$ and $\lambda_1$ are very close, then the derivative value given by equation (59) is obtained. However, as V($\lambda$) is given by equation (60), where S($\lambda$) is the spectral density of the source and I($\lambda$) the instrumental distortion including the slit function, the efficiencies of the gratings and of the detectors, in the derivative given by equation (61) it must be assumed that $dI/d\lambda=0$ in order to obtain a true differentiated spectrum. This is approximately the case in the VUV is a phosphor wavelength converter (i.e., sodium salicylate) is used. Moreover, if stray light and overlapping of order are taken into account and an optical knife such as a premonochromator [P. Bousquet, P. Roche, Nouv. Rev. Opt. App., 2(1971), 35] is used to increase the signal-to-noise ratio and the spectral purity, the condition $dI/d\lambda=0$ is generated.

Grazing Incidence Monochromators

As has been mentioned before, Greiner and Namioka have investigated the optical performance of Seya type monochromators using spherical and toroidal gratings having the classical parallel and equidistantly spaced grooves, but these devices do not permit working below about 200 Å. Lepere has suggested the use of a toroidal grating having a nonuniform distribution of grooves wherein the angle between the incident and diffracted beams is 142°, allowing the possibility of working down to about 150 Å.

As it has been pointed out before, the scope of this invention is to show that, by considering first the optimal correlation between the magnification and $2\theta$ values minimizing the odd terms of the wavefront aberration, new devices with performances can be also designed for grazing incidence. To illustrate this purpose, two practical solutions corresponding to two monochromators having approximately the same horizontal aperture, fitted with gratings having the same number of lines per mm and working at the same $2\theta = 166°$ value are examined in detail. With such devices the spectral range of about 50–400 Å can be covered where the lower limit is determined by the grating efficiency and the upper limit by the grating equation.

In the first case considered, I have found that a grazing incidence monochromator of high performance can be designed according to the principles of my application Ser. Nos. 277,857 and 537,460 for values of $2\theta$ greater than 160° if the magnification is less than 0.5 when working in the negative order, or greater than 2 when working in positive order. However, better resolution is obtained in the negative order.

The grating equation is given by equation (62) for the first order, and the generalized focussing condition given by equation (21).

EXAMPLE III $m = -1$
$R = 10$ m
$W_0 = 54$ mm
$L_0 = 27$ mm
$r = 1824.68$ mm
$r' = 693.82$ mm
$s = 50\mu$
$h' = 5$ mm
$\delta\lambda p = 0.4–0.2$ Å

The magnification for this mounting working in the minus order is 3802; if it is used in positive order (r→r'; r'→r), $\Gamma = 2.6299$.

In the second case considered, a general study of the aberrations expressed in function of $\Gamma$ and $\theta$ has been first made for $2\theta = 166°$ monochromator fitted with a 600 line/mm concave grating. I found that for the positive order +1, if $\Gamma = 2.6239$ (value which is almost the same as the value computed by the method described before) the $C_{04}$, $C_{22}$, $C_{03}'$ terms are very low. A practical example is given below.

EXAMPLE IV $m = +1$
$R = 4.628$ m
$W_0 = 50$ mm
$L_0 = 6$ mm
$r = 320.9$ mm
$r' = 842$ mm
$s = 10\mu$
$h' = 10$ mm
$\delta\lambda p = 0.5–0.8$ Å

Figure 11:
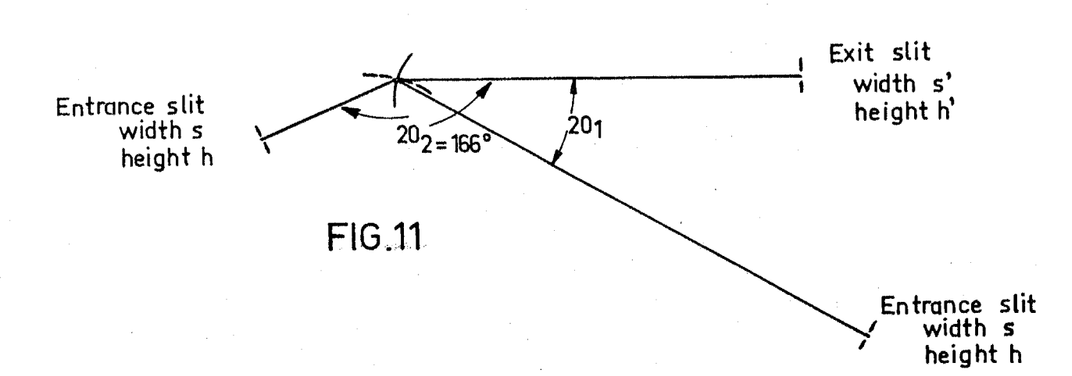
FIG. 11 illustrates another embodiment of this invention.

In Example IV, the optical aperture in the horizontal plane is $W_0 \cos \alpha/r \simeq 1/52$ and in the vertical plane is $L_0/r \simeq 1/52$, which compares with conventional devices of apertures of about 1/75 for resolution of the same order of magnitude. In order to increase the spectral range, a grating having a lower n value may be used or a double entrance slit monochromator (m=+1) may be employed as in FIG. 11. Example IV is computed so as to be compatible with an available monochromator working up to 5000 Å with an optically corrected spectral range of 250–3000 Å and having the following parameters:

R=99.79 cm
n=1200 lines/mm
$2\theta_2 = 34°$
$W_0 = L_0 = 54$ mm
r=1108.99 mm
r'=842.06 mm The $2\theta_2$ value of example IV was chosen in order to ensure that the optimum value of the luminosity resolution product is obtained at any wavelength for the fixed entrance and exit slit widths. The spectral range 50–5000 Å can be covered by the two gratings of FIG. 11. In the optically corrected spectral range 50–3000 Å, the resolution $\delta\lambda_p$ varies as a function of wavelength between 0.4–0.8 Å for the $10\mu$ entrance slit width.

Now the toroidal holographically grating can be, without any further computations, determined by taking into account of the optical properties of this mounting cited above. Indeed as for grazing incidence where generally also the aberrations are very important, we can assume that comparatively $C_{04}$, $C_{22}$ and $C_{03}$ terms are negligible, then the recording parameters must be determined in such way that $D_{04} = D_{22} = D_{03} = 0$ To decrease the computing time, I have found that equations (13) (22) (25) are also satisfied if $H=H'$, $\rho_C = \rho_D$ and $\delta = -\eta$, which leads to equations (63) and (63').

Grazing incidence monochromators may also be constructed using holographically formed cylindrical gratings. In this case, since R is simply a standard factor, equation (4c) is applicable as before except for the following notations:

$T = \cos^2\alpha/e$
$T' = \cos^2\beta/e'$
$S_1' = 1/e$
$S_1 = 1/e$
$H = \rho_C \cos^2\eta$
$H' = \rho_D \cos^2\delta$
$K' = \rho_C$
$K_1' = \rho_D$ The angles of incidence and diffraction are given by (64) for the minus order and by (65) for the positive order. The grating equation is given by equation (66) and the nominal number n of lines per mm by equation (13). The focussing condition in the horizontal plane is given by equation (67), the focalization of the incident rays being obtained by the defect of focus $D_h$ contributed by the phase variations associated with the non-uniform distribution of the grating grooves, equation (67) being thus equivalent to equation (68).

The stigmatic condition is given by equation (69) where p is −1 for mountings working in negative order and p=1 for mountings working in positive order, and the value of t is given by equation (70). As before, the last condition is that which minimizes the line broadening due to the coma terms, i.e., which minimizes $\zeta^2 + (5+\rho^2)\rho^2/9\zeta^2$. Again, as before, this fourth condition cannot be generalized but can be determined for particular cases.

EXAMPLE V

Inasmuch as $\gamma_m$ is generally ($\gamma_m < 10°$) for grazing incidence devices, $e' = tr'/R_v$ value can be obtained by solving equation (67) for the zero order, the holographic contribution vanishing also is taken as zero. Introducing the magnification $\Gamma$, a third order equation in $\Gamma$ comprising only $\theta$ and $e'$ is obtained. Simultaneously the same procedure is applied to the $C_{03}$ and $C_{22}$ aberration terms. Considering that in the sate of the art a $L_0/R_v$ ratio equal to 0.9 is a realistic value if $\rho = 0.3$ and $t = 1/30$, I have found solutions for $e' = 1$ providing $\Gamma \leq 10$.

For example, if $\theta = 83°$, solutions occur if:
$W_0 = 90$ mm
$L_0 = 27$ mm
$r' = 900$ mm
$r = 84.17$ mm
$R_v = 30$ mm, in which case the stigmatic condition is given by equation (71). Since the $C_{03}W_0^3$ coma term has a relatively low value in comparison with the $C_{21}L_0^2W$ coma term, the last condition is obtained by causing $D_{03} = 0$, which is the condition given by equation (72).

EXAMPLE VI

Figure 12:
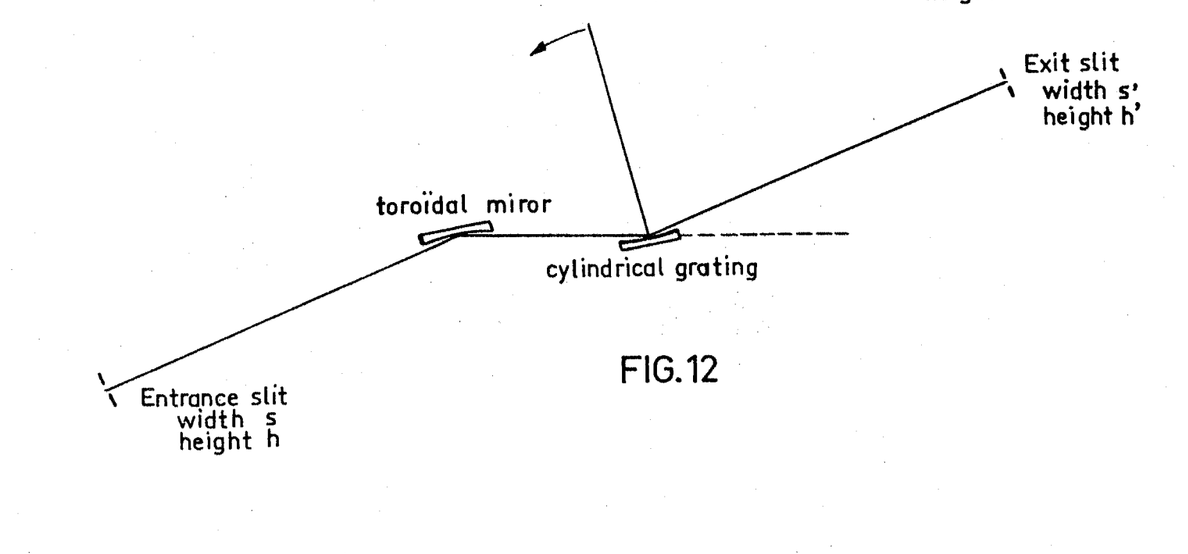
FIG. 12 illustrates another embodiment of this invention.

In this example, $\Gamma = -1$, in which case either the entrance or the exit slit is virtual and the source is focussed by a toroidal mirror behind the grating, as in FIG. 12. Such an arrangement is well adapted for synchrotron radiation since a mirror is generally introduced in the light path in order to prevent radiation damage. In this example, the focussing condition in the horizontal plane is given by equation (73) and $D_h$ is given by equation (74) were $p = \pm 1$ depending upon the order of diffraction, as before. The height of astigmatism takes the form of equation (73) and the value of t is given by equation (76). Since $C_{03}$ is equal to zero for $\gamma = 0$, only the case where $D_{03} = 0$ is considered, assuming that the best balancing effect for the coma broadening arises from correction of the $C_{21}L_0^2W_0$ coma term. This term (for m=−1) takes the form of equation (77) where $\gamma_0, \gamma_t$, and $\gamma_2$ are particular values of $\gamma$ which are optimized in each case as a function of n and $\theta$. The four conditions leading to the recording parameters are then equations (13), (74), (76) and equation (77) defining the value of $D_{21}$.

To illustrate a particular case, $D_{03} = D_{21} = 0$ occurs for $\rho_C = 0; \delta = 0$; and $\sin \rho = -\lambda_0$ with $\rho_D$ being given by equation (79) and $D_h$ being given by equation (80), with $p = 1.34164$. In the particular case where $D_h = -\rho_D$, i.e., where $2\rho_D = 1 \pm (4 \cos \rho - 3)^{\frac{1}{2}}$, if $\cos \rho = \frac{3}{4}$ ($n \approx 40°41'$) $D_h = -\frac{1}{2}$ for the conditions (81).

By using infrared laser, low values of n can be obtained. For example, if $\lambda_0 = 1.084\mu$, $n = 0.6101825$ tri/$\mu$, or if $\lambda_0 = 1.152\mu$, $n = 0.5741648$ tr/$\mu$.

Finally, for a mounting working at $\Gamma = -1$ in the −1 order, the $e'$ value is given by equation (82). If $\theta = 83°$, the parameters of the mounting are given by (81) with:
$re' = Re' \approx 2.1938R$  $R_v = Rt \approx 2.5107R$.

The height of astigmatism is very low since for $\gamma_m = 7°$, the height of astigmatism is only about $0.17L_0$.

APPENDIX $$u^2 + w^2 + l^2 = 2Ru - 2R^2(1-t) + \tag{1}$$

$$2R(1-t)(R-u)\left[1 + \frac{w^2}{(R-u)^2}\right]^{\frac{1}{2}} \tag{2}$$

$$u^w + w^2 + l^2 = 2Rtu + (1-t)w^2 + \left(\frac{1-t}{R}\right)uw^2 -$$

$$\left(\frac{1-t}{4R^2}\right)w^4 + \ldots + 5.a.h.0$$

$$n\lambda_0 = [<CP> - <DP>] - [<CO> - <DO>] \tag{3}$$

$$F = <AP> + <PB> + mn\lambda, \tag{4}$$

$$<AP>^2 = (x-u)^2 + (y-w)^2 + (z-l)^2 \tag{4a}$$
$$= r^2 + z^2 + u^2 + w^2 + l^2 - 2ur\cos\alpha - 2wr\sin\alpha - 2zl,$$

$$<PB>^2 = (x'-u)^2 + (y'-w)^2 + (z'-l)^2 \tag{4b}$$
$$= r'^2 + z'^2 + u^2 + w^2 + l^2 - ur'\cos\beta - 2wr'\sin\beta - 2z'l.$$

$$F = (r + r')\left(1 + \frac{z^2}{r^2}\right)^{\frac{1}{2}}$$

$$- w\left[(\sin\alpha + \sin\beta)\left(1 + \frac{z^2}{r^2}\right)^{-\frac{1}{2}} - \frac{m\lambda}{\lambda_0}(\sin\delta - \sin\eta)\right]$$

$$- \frac{wl}{R}\frac{z}{r}\left(\frac{\sin\alpha}{e} - \frac{\sin\beta}{e'}\right)$$

$$+ \frac{w^2}{4R}\frac{z^2}{r^2}\left[2\frac{\sin^2\alpha}{e} + \frac{2\sin^2\beta}{e'} - (T + T')\right]$$

$$- \frac{l^2}{4R}\frac{z^2}{r^2}\left[\frac{2}{e} + \frac{2}{e'} + S_2 + S_2'\right]$$

$$+ \frac{w^2 l}{2R^2}\frac{z}{r}\left[\frac{T}{e} - \frac{T'}{e'} + \frac{2\sin^2\beta}{e'^2} - \frac{2\sin^2\alpha}{e^2}\right]$$

$$+ \frac{w^2}{2R}\left[T + T' + \frac{m\lambda}{\lambda_0}(H - H')\right]$$

$$+ \frac{l^2}{2R}\left[S_2 + S_2' + \frac{m\lambda}{\lambda_0}(K_2 - K_2')\right]$$

$$+ \frac{w^3}{2R^2}\left[T\frac{\sin\alpha}{e} + T'\frac{\sin\beta}{e'} + \frac{m\lambda}{\lambda_0}(H\rho_C\sin\eta - H'\rho_D\sin\delta)\right]$$

$$+ \frac{w^4}{8R^3}\left[S_1 + S_1' + \frac{m\lambda}{\lambda_0}(K_1 - K_1')\right]$$

$$+ \left(\frac{4\sin^2\alpha}{e^2} - \frac{T}{e}\right)T + \left(\frac{4\sin^2\beta}{e'^2} - \frac{T'}{e'}\right)T'$$

$$+ \frac{m\lambda}{\lambda_0}\{H(4\rho_C{}^2\sin^2\eta - \rho_C H) - H'(4\rho_D{}^2\sin^2\delta - \rho_D H')\}$$

$$+ \frac{w^2 l^2}{4R^3}\left[\frac{S_1 + S_1'}{t} + \frac{2\sin^2\alpha}{e^2}S_2 + \frac{2\sin^2\beta}{e'^2}S_2' - \frac{TS_2}{e} - \frac{T'S_2'}{e'}\right]$$

$$+ \frac{m\lambda}{\lambda_0}\left\{\frac{K_1 - K_1'}{t} + 2\rho_C{}^2\sin^2\eta K_2 + 2\rho_D{}^2\sin^2\delta K_2'\right.$$
$$\left. - HK_2\rho_C + H'K_2'\rho_D\right\}$$

$$+ \frac{wl^2}{2R^2}\left[S_2\frac{\sin\alpha}{e} + S_2'\frac{\sin\beta}{e'} + \frac{m\lambda}{\lambda_0}(K_2\rho_C\sin\eta - K_2'\rho_D\sin\delta)\right]$$

$$+ \frac{l^4}{8R^3 t^2}\left[S_2\left(1 - \frac{S_2}{e}\right) + S_2'\left(1 - \frac{S_2'}{e'}\right) +\right.$$

$$\left.\frac{m\lambda}{\lambda_0}\{K_2(1 - K_2\rho_C) - K_2'(1 - \rho_D K_2')\}\right] \tag{4c}$$

$$+ \ldots 5.a.h.0.$$

where:
$$r = Re \quad r' = Re' \quad R_V = tR$$
$$\rho_C = \frac{R}{r_C}; \quad \rho_D = \frac{R}{r_D}$$
$$T = \frac{\cos^2\alpha}{e} - \cos\alpha \quad T' = \frac{\cos^2\beta}{e'} - \cos\beta$$
$$S_1 = -\frac{1}{e}\cos\alpha \quad S_1' = \frac{1}{e'} - \cos\beta$$
$$S_2 = \frac{1}{e} - \frac{\cos\alpha}{t} \quad S_2' = \frac{1}{e'} - \frac{\cos\beta}{t}$$

$$H = \rho_C\cos^2\eta - \cos\eta \quad H' = \rho_D\cos^2\delta - \cos\delta$$
$$K_1 = \rho_C - \cos\eta \quad K_1' = \rho_D - \cos\delta$$
$$K_2 = \rho_C - \frac{\cos\eta}{t} \quad K_2' = \rho_D - \frac{\cos\delta}{t}$$

$$F = F_0 + C_{10}l + C_{01}w + C_{11}wl + \left(C_{02} + \frac{m\lambda}{\lambda_0}D_{02}\right)w^2 \tag{5}$$
$$+ \left(C_{20} + \frac{m\lambda}{\lambda_0}D_{20}\right)l^2 + \Sigma_{ij}\left(C_{ij} + \frac{m\lambda}{\lambda_0}D_{ij}\right)l^i w^j$$
$$i + j > 2$$

$$\frac{\partial F}{\partial w} = 0 \tag{6}$$

$$\frac{\partial F}{\partial l} = 0 \tag{7}$$

$$\Delta_p(w,l) = -C_{02}w^2 + C_{04}w^4 + C_{22}w^2 l^2 - C_{20}l^2 + C_{40}l^4 \tag{8}$$
$$+ \frac{m\lambda}{\lambda_0}[-D_{02}w^2 + D_{04}w^4 + C_{22}w^2 l^2 - D_{20}l^2 + D_{40}l^4]$$
$$+ \Sigma_p(w,l)$$

$$\Delta_p'(w,l) = -(C_2 + C_{02})w^2 - C_{20}l^2 + C_{40}l^4 \tag{9}$$
$$+ \frac{m\lambda}{\lambda_0}[-(D_2 + D_{02})w^2 - D_{20}l^2 + D_{40}l^4]$$

$$\Delta_0(w,l) = -C_{01}w - C_{10}l - C_{11}wl + C_{03}w^3 + C_{21}l^2 w \tag{10}$$
$$+ \frac{m\lambda}{\lambda_0}[D_{03}w^3 + D_{21}l^2 w] + \Sigma_0(w,l)$$

$$\Delta_0'(w,l) = -(C_1 + C_{01})w - C_{10}l - C_{11}wl \tag{11}$$

$$\frac{\lambda_0}{\sin\delta - \sin\gamma}(\sin\alpha + \sin\beta) = m\lambda \tag{12}$$

$$n\lambda_0 = \sin\delta - \sin\eta > 0 \tag{13}$$

$$\frac{z}{r} = -\frac{z'}{r'} \tag{14}$$

$$\Gamma = \frac{r'}{r} = \frac{e'}{e} \tag{15}$$

$$\tag{16}$$

$$C_{02} + \frac{m\lambda}{\lambda_0}D_{02} = -\left[C_2 + \frac{m\lambda}{\lambda_0}D_2\right]$$

$$C_1 = mn\Delta\lambda = \cos\beta\Delta\beta \tag{17}$$

$$\Delta'(w,l) = -C_{20}l^2 + C_{40}l^4 - C_{10}l - C_{11}wl \tag{18}$$

$$\tag{19}$$

$$Q^2 = \left[\frac{mn<\delta\lambda>}{\cos\beta}\right] = \frac{1}{4ab}\int_{-a}^{a}\int_{-b}^{b}\left\{\frac{\partial\Delta'(w,l)}{\partial w} + \frac{\partial\Delta'(w,l)}{\partial l}\right\}^2 dw\,dl$$

$$\tag{20}$$

$$\frac{\cos^2\alpha}{e} + \frac{\cos^2\beta}{e'} - \cos\alpha - \cos\beta$$
$$+ [\rho_C\cos^2\eta - \rho_D\cos^2\delta - \cos\eta + \cos\delta]\frac{m\lambda}{\lambda_0}$$

$$= \frac{RW_0^2}{2}\left[\frac{6}{5}\chi + \frac{\rho^2 \nu}{3}\right]$$

where
$$\rho = \frac{L_0}{W_0}, \quad \rho_C = \frac{R}{r_C}, \quad \rho_D = \frac{R}{r_D}$$
$$\chi = C_{04} + \frac{m\lambda}{\lambda_0}D_{04}, \quad \nu = C_{22} + \frac{m\lambda}{\lambda_0}D_{22}$$

$$\frac{\cos^2\alpha}{e} + \frac{\cos^2\beta}{e'} = H_0 + H(\lambda) \tag{21}$$

where $$H_0 = \cos\alpha + \cos\beta$$

$$H(\lambda) = \frac{R}{2}W_0^2\left[\frac{6}{5}C_{04} + \frac{\rho^2}{3}C_{22}\right]$$

$$D_h = \rho_C\cos^2\eta - \rho_D\cos^2\delta - \cos\eta + \cos\delta \tag{22}$$
$$- \frac{R}{2}W_0^2\left[\frac{6}{5}D_{04} + \frac{\rho^2}{3}D_{22}\right] = 0$$

$$2R = C_{20} = \frac{1}{e} + \frac{1}{e'} = \frac{\cos\alpha}{t} - \frac{\cos\beta}{t} = 0 \tag{23}$$

$$t = \frac{\Gamma\cos^2\alpha + \cos^2\beta - e'H(\lambda)}{1 + \Gamma} \tag{24}$$

$$\cos\eta - \cos\delta = t[\rho_C - \rho_D + f_1(\lambda_a)] \tag{25}$$

where

-continued
APPENDIX $$f_1(\lambda_a) = \frac{2\lambda_0 R}{m\lambda_a} C_{20}$$

Astigmatism $\frac{\alpha l^2}{2R} \{S_2 + S_2' \frac{m\lambda}{\lambda_0} (K_2 - K_2')\} = 0$ $l^2\{C_{20} + \frac{m\lambda}{\lambda_0} D_{20}\} = 0$ $\rho_C = \frac{\cos\eta}{t} = \rho_D + \frac{\cos\delta}{t} = \frac{\lambda_0}{m\lambda}(S_2 + S_2')$ At one wavelength $\lambda_a$:

$$\frac{\cos\eta - \cos\delta}{t} = \rho_C \rho_D + \frac{\lambda_0}{m\lambda_a}(S_2 + S_2') \quad (26)$$

$\cos\eta - \cos\delta = t[\rho_C - \rho_D + f_1(\lambda_a)]$ $$Q^2 = W_0^6 \left[ \frac{X^2}{175} + \frac{v^2\rho^2}{240} + \left(\frac{\sigma v}{60} + \frac{v^2}{540}\right)\rho^4 + \frac{\sigma^2}{28}\rho^6 \right]$$

$$+ \frac{W_0^4}{20}\left[\zeta^2 + (5 + \rho^2)\xi^2 \frac{\rho^2}{9}\right]$$

where
$\zeta = C_{03} + \frac{m\lambda}{\lambda_0} D_{03}$ $\xi = C_{21} + \frac{m\lambda}{\lambda_0} D_{21}$ $\sigma = C_{40} + \frac{m\lambda}{\lambda_0} D_{40}$ $Z_a(\lambda) = L e' \{c_{20} + \frac{m\lambda}{\lambda_0} d_{20}\} \quad (27)$ with $c_{20} = -2RC_{20}$
$d_{20} = -2RD_{20}$ $\alpha = -\gamma + \theta; \beta = -\gamma - \theta; \lambda = \frac{2}{n}\sin\gamma\cos\theta \quad (28)$ $Z_a(\lambda) = L(\Gamma + 1)\{1 - \frac{2e'\cos\theta}{t(\Gamma + 1)}\cos\gamma + \quad (29)$ $2\rho \frac{e'\cos\theta\sin\gamma}{n\lambda_0(\Gamma + 1)} d_{20}\}$ $\cos\gamma_t = \frac{2e'\cos\theta}{t(\Gamma + 1)}; \sin\gamma_h = -\frac{2\rho e'\cos\theta}{n\lambda_0(\Gamma + 1)} d_{20} \quad (30)$ $Z_a(\lambda) = L(\Gamma + 1)\psi(\gamma_t,\gamma_h) \quad (31)$ with
$\psi(\gamma_t,\gamma_h) = \cos\gamma(\cos\gamma - \cos\gamma_t) + \sin\gamma(\sin\gamma - \sin\gamma_h) \quad (32)$
$\gamma_t = \gamma m/2.85; \gamma_h = \gamma m/2 \quad (33)$ $d_{20} = -\frac{n\lambda_0}{\rho t}\sin(\gamma m/2)\cos^{-1}(\gamma_m/2.85) \quad (34)$ where
$\cos(\gamma m/2.85) = \frac{2e'\cos\theta}{t(\Gamma + 1)}$ $D_{21} = -\frac{\lambda_0}{m\lambda} C_{21} - \quad (26')$ $2R^2 C_{21} = S_2 \frac{m\alpha}{e} + S_2' \frac{m\beta}{e} =$ $\frac{\cos\theta\cos\gamma}{e'^2}\left[\tan\theta\{\Gamma^2 - 1 - \cos\gamma\frac{\cos\gamma_t}{2}(\Gamma^2 - 1) - \right.$ $\cos\gamma\frac{\cos\gamma_t}{2}(\Gamma^2 + 1)\tan\gamma\tan\theta\} - \tan\gamma\{\Gamma^2 + 1 -$ $\left.\cos\gamma\frac{\cos\gamma_t}{2}(\Gamma^2 + 1), \cos\gamma\frac{\cos\gamma_t}{2}(\Gamma^2 - 1)\tan\gamma\tan\theta\}\right]$ if $\Gamma = 1$ $2R^2 C_{21} = \frac{\cos\theta\cos\gamma}{e'^2}[-\sin\gamma 2\cos\gamma_t \tan\theta - 2\tan\gamma + 2m\gamma\cos\gamma_t] =$ $\frac{-2m\gamma\cos\theta}{e'^2}[1 + \cos\gamma\cos\gamma_t(\tan\theta - 1)]$ By expressing $S_2 m\alpha/e + S_2' m\beta/e'$ in function of $\Gamma, \theta$ and $\gamma$, the rotation of the grating, and by choosing $\Gamma = 1$ and $\tan\theta = 1$, we obtain:

$$\frac{\lambda_0}{\lambda} = \frac{\lambda_0}{2R^2 e'^2} \frac{2\sin\gamma\cos\theta}{\lambda} = \frac{n\lambda_0}{2R^2 e'^2} \quad (35)$$

$\theta = 45°; \Gamma = \frac{e'}{e} = 1; m = -1 \quad (36)$ $d_{21} = K_2 \rho_C \sin\eta - K_2' \rho_D \sin\delta = \frac{n\lambda_0}{e'^2} \quad (37)$ $\zeta \frac{W^3}{\lambda} = m \frac{nW^3}{2R^2 e'^2}\left[\cos^2\gamma - 0.5 - \frac{e_2' d_{03}}{n\lambda_0}\right] \quad (38)$ $= m \frac{nW^3}{2R^2 e'^2}\left[\cos^2\gamma - 0.5 + \frac{d_{03}}{d_{21}}\right]$ $d_{03} = = Pd_{21} \quad (39)$
$P = \cos^2\gamma_{03} - 0.5 \quad (40)$ $\zeta \frac{W^3}{\lambda} = m \frac{nW^3}{2R^2 e'^2}[\cos^2\gamma - \cos^2\gamma_{03}] \quad (41)$ $n\Lambda = \sqrt{2}\sin\gamma_{03}, m = -1 \quad (42)$ $D_h = \frac{\lambda_0}{\lambda}\left[\frac{\cos^2\alpha}{e} + \frac{\cos^2\beta}{e'} - H_0 - H(\lambda)\right] \quad (43)$ $\rho_c - \frac{\cos\eta}{t} - \rho_D + \frac{\cos\delta}{t} = \quad (34')$ $-\frac{n\lambda_0}{pt}\sin(\gamma m/2)\cos^{-1}(\gamma m/2.85)$ $(\rho_c - \frac{\cos\eta}{t})\rho_c\sin\eta - (\rho_D - \frac{\cos\delta}{t})\rho_D\sin\delta = \frac{n\lambda_0}{e'^2} \quad (37')$ $\rho_c \cos^2\eta - \rho_D \cos^2\delta - \cos\eta + \cos\delta -$ $\frac{1}{2} RW_0^2 \left[\frac{6}{5} D_{04} + \frac{\rho^2}{3} D_{22}\right]$ $= \frac{n\lambda_0}{\sqrt{2}\sin\gamma}\left[\frac{\cos^2\alpha}{e} + \frac{\cos^2\beta}{e'} - H_0 - H(\lambda)\right] \quad (43')$ $\frac{\cos^2\alpha}{e} + \frac{\cos^2\beta}{e'} = \cos^2\alpha + \cos^2\beta \quad (44)$ $\Omega = W_0 \cos\theta / Re \quad (45)$ $\frac{C_{21}\rho^2 W^3}{\lambda} = nW \frac{\rho^2\Omega^2}{2} \quad (46)$ $\frac{C_{03}W^3}{\lambda} = -\frac{nW\Omega^2}{4}(1 - 2\cos^2\gamma) \approx \frac{nW\Omega^2}{4} \quad (47)$ $R_C \Omega^2 \leq 17.88 \quad (48)$
where
$p = L_0 W_0^{-1} = .64457 \quad (49)$ $\epsilon(\gamma) = \frac{\cos^2\alpha}{e} + \frac{\cos^2\beta}{e'} - H_0 - H(\lambda) \quad (21')$ $\epsilon(\gamma) R_d \Omega \leq 7\sin\gamma \quad (50)$ $e^{-1} = \sqrt{2}\cos\gamma_0 = \sqrt{2}\cos 3° \quad (51)$ $P^* = \tau \sqrt{2} n\lambda\Omega^2 h' KR_e \quad (52)$ $\{1 + \frac{2d_{03}}{d_{21}}\}R_C\Omega \leq 12.65 \quad (53)$ $Z_a(\gamma) = L(\Gamma + 1)\sin\gamma[\tan\gamma/2 - \psi(\gamma 2)] \quad (29')$
where
$\psi(\gamma 2) = -\rho \frac{d_{20}}{2n\lambda_0}$ $R_C \Omega^2 \leq 6.325 \quad (53')$
$d_{21} - f_2 = 0; d_{03} + Pd_{21} = 0 \quad (54)$
$\{\cos^2\gamma - \cos^2\gamma_{03}\}R_C\Omega^2 \leq 12.66 \quad (55)$
$\sin^3\delta - \sin^3\eta = Pn\lambda_0 \quad (54-1)$
$-(\sin\delta\cos\delta - \sin\eta\cos\eta)(1 - t - P) = 2qt\sin\delta(P - \sin^2\delta) \quad (54-2)$
$2tf_2 = (1 - t - P)q(\sin\delta\cos\delta + \sin\eta\cos\eta) \quad (54-3)$
where
$q = \frac{\cos\delta - \cos\eta}{t} + \frac{n\lambda_0}{Pt}\sin(\gamma_m/2)\cos^{-1}(\gamma_m/2.85)$ $\rho_D = D \frac{(P + t)}{t} \quad (55)$
where
$D = \cos\delta/(P + \cos^2\delta)$ $\rho_C = E \frac{(P + t)}{t}$
where
$E = \cos\eta/(P + \cos^2\eta) \quad (55')$
$t^2[E^2\sin\eta - D^2\sin\delta - f_2] - t[E^2\sin\eta(\cos^2\eta - P) - \quad (56)$
$D^2\sin\delta(\cos^2\delta - P)] - P(E^2\sin\eta\cos^2\eta - D^2\sin\delta\cos^2\delta) = 0$ -continued $$\sin\gamma_h = \frac{\cos\gamma t}{n\lambda_0}[E(t - \cos 2\eta) - D(t - \cos 2\delta)] \quad (57)$$

$$\sin\delta = \frac{n\lambda_0}{2} = -\sin\eta; \rho_C = \rho_D = \cos\delta/(P + \cos^2\delta) \quad (58)$$

$$\frac{dV(\lambda)}{d\lambda} = \frac{V(\lambda_2) - V(\lambda_1)}{\lambda_2 - \lambda_1} \quad (59)$$

$$V(\lambda) = S(\lambda)I(\lambda) \quad (60)$$

$$\frac{dV(\lambda)}{d\lambda} = S(\lambda)\frac{dI}{d\lambda} + I(\lambda)\left(\frac{dS}{d\lambda}\right) \quad (61)$$

$$\sin\alpha + \sin\beta = mn\lambda \quad (62)$$

$$\rho_C\rho_D = \cos\delta^{-1} \quad (63)$$

$$\sin\delta = -\sin\eta = \frac{n\lambda_0}{2}$$

$$d_{21} = \frac{2\tan\delta}{t\cos\delta}(\cos^2\delta - t) \quad (63')$$

$$t = \frac{2e'\cos\theta}{\Gamma + 1}$$

$$\alpha = -\gamma + \theta \ \beta = -\gamma - \theta \text{ or} \quad (64)$$
$$\alpha = -\gamma - \theta \ \beta = -\gamma + \theta$$

$$\alpha = \gamma + \theta \ \beta = \gamma - \theta \text{ or} \quad (65)$$
$$\alpha = \gamma - \theta \ \beta = \gamma + \theta$$

$$2\sin\gamma\cos\theta = n\lambda \quad (66)/(67)$$

$$\frac{\cos^2\eta}{e} + \frac{\cos^2\delta}{e'} + \frac{\lambda m}{\lambda_0}[\rho_C\cos^2\eta - \rho_D\cos^2\delta] =$$

$$\frac{1}{2} RW_0^2\left[\frac{6}{5}X + \frac{\rho^2}{3}\nu\right]$$

where $$X = C_{04} + \frac{m\lambda}{\lambda_0} D_{04} \quad \nu = C_{22} + \frac{m\lambda}{\lambda_0} D_{22}$$

$$\frac{\cos^2\alpha}{e} + \frac{\cos^2\beta}{e'} - \frac{1}{2}RW_0^2\left[\frac{6}{5}C_{04} + \frac{\rho^2}{3}C_{22}\right] = -\frac{m\lambda}{\lambda_0} D_h \quad (68)$$

$$\rho_C - \frac{\cos\eta}{t} - \rho_D + \frac{\cos\delta}{t} = -\frac{n\lambda_0}{pt}\sin(\gamma_m/2) \quad (69)$$

$$t = \frac{2e'\cos\theta}{(\Gamma + 1)} \quad (70)$$

$$\rho_C - \frac{\cos\eta}{t} - \rho_D + \frac{\cos\delta}{t} = -[\Gamma + 1 - 60\cos\theta]\frac{\lambda_0}{\lambda} \quad (71)$$

$$\rho_C^2\sin\eta\cos^2\eta = \rho_D^2\sin\delta\cos^2\delta \quad (72)$$

$$4\sin\theta\cos\theta[\cos\gamma_0 - \cos\gamma]\sin\gamma - \quad (73)$$

$$\frac{1}{2}RW_0^2\left[\frac{6}{5}C_{04} + \frac{\rho^2}{3}C_{22}\right] = 0$$

$$D_h = p\frac{2n\lambda_0\sin\theta\cos\gamma_0}{e'} \quad (74)$$

$$Z_{(a)} = 2L_0\frac{e'\cos\theta}{t}[\cos\gamma - \sin\gamma\cos\gamma_t] \quad (75)$$

$$t = \frac{n\lambda_0\cos\gamma_t}{p(K_2 - K_2)} \quad (76)$$

$$C_{21}L_0^2W_0 = \frac{e'\sin 2\theta L_0^2 W_0}{2R^2 e'^2}\left(\frac{\sin\gamma - \sin\gamma_2}{\sin\gamma_2}\right)(1 + 2\sin\gamma\sin\gamma_2) \quad (77)$$

$$D_{21} = \frac{n\lambda_0}{e'}\left[\sin\theta\left(\frac{1 - 2\sin^2\gamma_2}{\sin\gamma_2}\right) - \frac{1}{e'}\right] \quad (78)$$

$$t\rho_D = n\lambda_0\cos\gamma_t + 1 - \cos\eta \quad (79)$$

$$D_h = -\rho_D + \rho_D^3 + \frac{1}{t}(1 - \cos\eta - \rho_D + \rho_D^2 - t\rho_D^3) \quad (80)$$

$$\delta = 0; \rho_D = 5; \sin\eta = -n\lambda_0 = \sqrt{\frac{7}{4}}; \rho_C = 0 \quad (81)$$

$$e' = \sqrt{7} \ \sin\theta\cos\gamma_0 = \frac{\sin\gamma_2}{\sin\theta(1 - 2\sin^2\gamma_2)} \quad (82)$$

What is claimed is:

1. The method of making a monochromator using a concave, reflecting holographically formed diffraction grating, which comprises the steps of:

(a) determining the physical parameters of the monochromator by using a concave classical reflective diffraction grating having straight, parallel lines which are equidistantly spaced to provide a line density n, a height $L_0$ and a width $W_0$, the monochromator having fixed entrance and exit slits spaced from the grating to provide a predetermined magnification and a predetermined angle $2\theta$ between the incident and diffracted beams, whereby the odd terms of the aberration wavefront is minimized, the grating being mounted for rotation only with respect to said slits whereby to scan a spectral range of interest, said physical parameters being the distances of said entrance and exit slits with respect to the intersection of their optical axes at the center of the reflective surface of said grating, and said physical parameters being selected to provide a defect of focus which balances second order aberration terms excepting astigmatism whereby the partial derivative $\partial F_1/\partial w$ is equal to zero, $F_1$ being the optical path associated with said classical grating and w and l being Cartesian coordinates with respect to the center of said grating extending respectively perpendicular and parallel to said grating lines;

(b) holographically forming a grating by locating two point sources of monochromatic light of wavelength $\lambda_0$ in a plane containing the axis of the coordinate w and passing through the center of and normal to a holographic blank having the concavity of said classical grating, such that said point sources are located by four position parameters which are the respective distances $r_C$ and $r_D$ of said point sources from said center of the holographic blank and the angle $\eta$ and $\delta$ which lines from such point sources to said center respectively make with a line passing through such center and normal to said holographic blank; said four position parameters being established by four simultaneous equations the first of which defines the number n of grating lines holographically formed, the second of which defines astigmatic correction effected by the hologram provided by said point sources, the third of which defines coma correction effected by the hologram provided by said point sources, and the fourth of which defines the focussing condition in said plane effected by the hologram provided by said point sources; and (c) substituting the holographically formed grating for said classical grating.

2. The method defined in claim 1 where $2\theta = 90°$ and said entrance and exit slits are real and equidistantly spaced from the classical grating.

3. The method according to claim 2 wherein said holographically formed grating is spherical having parallel and equidistant grooves.

4. The method according to claim 2 wherein said holographically formed grating is toroidal having parallel and equidistant grooves.

5. The method according to claim 2 wherein said holographic blank is toroidal having a nonuniform groove distribution and wherein said four equations are:

$$\sin\delta - \sin\eta = n\lambda_0 \quad (1)$$

$$\rho_C - \frac{\cos\eta}{t} - \rho_D + \frac{\cos\delta}{t} = -\frac{n\lambda_0}{pt}\sin(\gamma_m/2)\cos^{-1}(\gamma_m/2.85) \quad 2.$$

-continued $$(\rho_c = \frac{\cos\eta}{t})\rho_c\sin\eta - (\rho_D - \frac{\cos\delta}{t})\rho_D\sin\delta = \frac{n\lambda_0}{e'^2} \quad 3.$$

$$\rho_C\cos^2\eta - \rho_D\cos^2\delta - \cos\eta + \quad 4.$$

$$\cos\delta \frac{RW_0^2}{2}\left[\frac{6}{5}D_{04} + \frac{\rho^2}{3}C_{22}\right] =$$

$$\sqrt{\frac{n\lambda_0}{2\sin\gamma}}\left[\frac{\cos^2\alpha}{e} + \frac{\cos^2\beta}{e'} - H_0 - H(\lambda)\right]$$

where
R is the radius of curvature of the blank in the horizontal plane, tR is the radius of curvature of the blank in the vertical plane $$\rho_C = \frac{R}{r_C}$$
$$\rho_D = \frac{R}{r_D}$$

$\rho = \pm$ depending upon whether the order of diffraction is positive or negative $\gamma_m$ is the maximum angle of rotation of the grating $t = R/R_v$ where $R_v$ is the radius of curvature of the blank in the vertical plane $D_{04}$ and $D_{22}$ are fourth order aberration terms contributed by the holographic formation of the grating $H_0 = \cos\alpha = \cos\beta$ $$H(\lambda) = \frac{RW_0^2}{2}\left[\frac{6}{5}C_{04} = \frac{\rho^2}{3}C_{22}\right]$$

where $C_{04}$ and $C_{22}$ are fourth order aberration terms contributed by the physical parameters of step (a).

6. The method defined in claim 1 wherein said holographic blank is cylindrical, $2\theta = 166°$ and said entrance and exit slits are equidistantly spaced from the classical grating.

7. A monochromator constructed according to the method of claim 1.

8. A monochromator according to claim 7 wherein said grating is torodial and is provided with a non-uniform distribution of grating lines which minimizes coma over said spectral range.

9. A derivative spectrometer comprising in combination two monochromators according to claim 7 wherein said monochromators are using the same driving mechanism.

10. A monochromator according to claim 7 wherein said grating is toroidal with uniform distribution of grating lines.

11. A monochromator as defined in claim 7 wherein $2\theta = 90°$.

12. A monochromator as defined in claim 7 wherein $2\theta = 66°$.

* * * * *